United States Patent [19]

Findon

[11] 3,958,355

[45] May 25, 1976

[54] COMBINATION BAIT HOLDER AND FISH HOOKING MEANS

[76] Inventor: Harry L. Findon, 501 Blue Heron Drive, Apt. 110A, Hallandale, Fla. 33009

[22] Filed: Apr. 7, 1975

[21] Appl. No.: 565,410

[52] U.S. Cl. ............................................. 43/44.2
[51] Int. Cl.² .......................................... A01K 83/06
[58] Field of Search ..................................... 43/44.2

[56] References Cited
UNITED STATES PATENTS

| | | | |
|---|---|---|---|
| 2,582,646 | 1/1952 | Moore | 43/44.2 |
| 2,927,393 | 3/1960 | Flamisch et al. | 43/44.2 |

*Primary Examiner*—Louis G. Mancene
*Assistant Examiner*—Daniel J. Leach

[57] ABSTRACT

A combination bait holder and fish hooking means includes an arcuate backbone piece for placement along and adjacent to the back of a bait fish, and a mouth clamping end, a portion of which is placed in the mouth of the bait fish. The holder and fish hooking means includes two hooks pivotally connected to the other end of the arcuate backbone piece. The movable hooks have barbed ends that are used to impale the rear of the bait fish, which is thereby fixed between the hooks and the mouth of the bait fish is held by the mouth clamping end.

5 Claims, 4 Drawing Figures

COMBINATION BAIT HOLDER AND FISH HOOKING MEANS

BACKGROUND OF THE INVENTION

The present invention pertains to an improved type of combination bait holder and fish hooking means, and is more particularly directed to a clip type mouth connection means for fish bait with an arcuate intermediate member and with two pivotally connected fish hooks at the distal end of the arcuate member.

In the past, combination bait holding and hook means utilized impaling members to connect the head of fish bait to the holder. Separate connecting means were sometimes used between the fishing line and the fish hook. Such head impaling devices tend to destroy the bait. Any wounds on the head of the bait fish tend to shorten the time required to totally destroy the bait when the bait is pulled through the water during trolling. The Weiss U.S. Pat. No. 2,476,126 and the Hampton U.S. Pat. No. 1,791,723 show such old prior art devices.

BRIEF DESCRIPTION OF THE INVENTION

A combination bait holder and fish hooking means is disclosed that includes an arcuate backbone piece with a clamping end and at least one hook connected to the other end. In use the arcuate piece is placed on and adjacent the backbone of a bait fish. The mouth clamping portion or means includes a fishing line connecting means, and a hill-and-dale end portion that is biased towards the adjacent arcuate backbone piece. In the preferred embodiment, the arcuate backbone piece is a single piece of wire with the distal end shaped in a hill-and-dale fashion that is bent under into juxtaposition with an adjacent arcuate backbone portion. The most lateral areas on the hill or hills of the distal end hill-and-dale portion are in clamping contact with the adjacent arcuate backbone piece. The bend between the hill-and-dale portion and the arcuate backbone piece is the fishing line connecting means.

In use, the distal end hill-and-dale portion is moved longitudinally into the mouth of the bait fish to clamp the roof of the fish's mouth against the adjacent arcuate backbone piece. Also, the hill-and-dale portion of the mouth clamping portion or means is designed to fill the mouth of the fish to improve the trolling characteristics of the fish bait. Once the mouth clamping portion is secured to the bait fish, the bait fish is prevented from being moved forward off of the combination bait holder and fish hooking means. The bend between the mouth clamping portion and arcuate backbone piece provides the fishing line connecting means for connecting the combination bait holder and fish hooking means to a fishing line.

At least one hook is connected to the other end of the arcuate backbone piece. In the preferred embodiment two hooks are pivotally connected to the other end of the arcuate backbone piece. The shanks of the hooks are positioned to allow the barbs of the hooks to move toward and away from one another while the eyes of the hooks remain connected to the other end of the arcuate backbone piece.

In use, the bait fish may be first placed between the barbed ends of the hook and as the bait fish is moved a slight distance rearwardly, the barbed hooks may be moved together in order to impale the back of the bait fish onto the barbs of the hooks. The hooks prevent rearward movement of the fish bait off of the combination bait holder and fish hooking means.

It is an object of this invention to provide an economical combination bait holder and fish hooking means.

It is another object of this invention to provide a bait holder and fish hooking means having a forward mouth clamping portion.

Another object of this invention is a combination bait holder and fish hooking means having a mouth clamping portion, a portion of which is placed inside the mouth of the bait fish in order to clamp the head of the fish against the main body of the bait holder and fish hooking means.

A further object of this invention is to provide a mouth clamping portion for a combination bait holder and fish hooking means that includes a distal hill and dale clamping member that clamps the roof of the mouth of the bait fish to the body of the bait holder and fish hooking means and also generally fills the mouth of the fish.

Another object of this invention is to provide a combination bait holder and fish hooking means that has a mouth clamping portion at one end of the main body and a pivotable hooking means at the other end of the main body.

An additional object of this invention is to provide a bait holder and fish hooking means having an arcuate backbone piece with a hill-and-dale mouth clamping portion at one end and hooking means at the other end.

In accordance with these and other objects which will be apparent hereinafter, the instant invention will now be described with particular reference to the accompanying drawing.

DESCRIPTION OF A PREFERED EMBODIMENT

Figure 1:
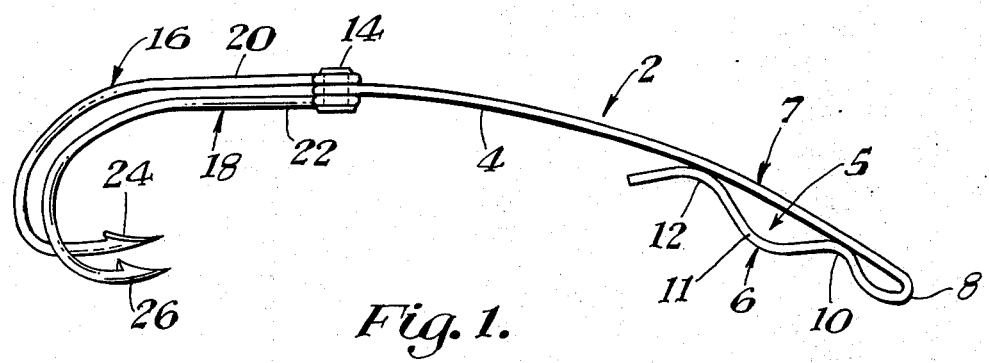
FIG. 1 is a side view of the combination bait holder and fish hooking means.
Figure 2:
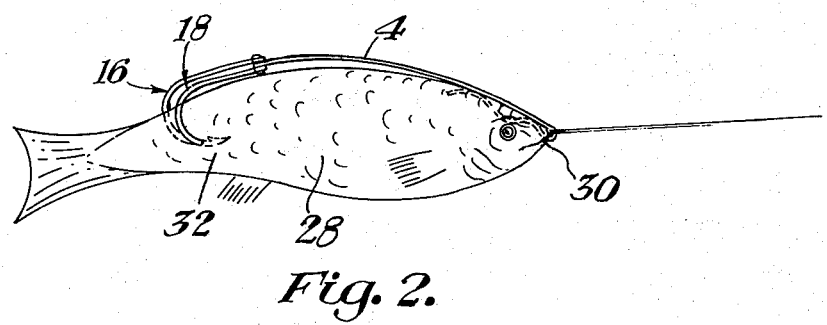
FIG. 2 is a side view illustration of the combination bait holder and fish hooking means connected to a bait fish and fishing line.
Figure 3:
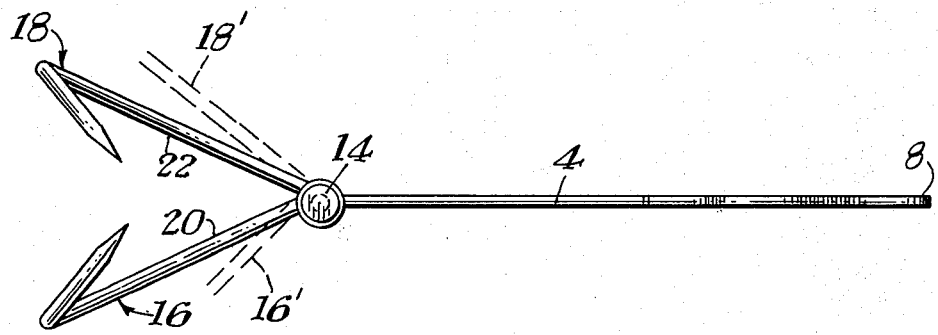
FIG. 3 is a bottom view of the combination bait holder and fish hooking means as shown in FIG. 1.
Figure 4:
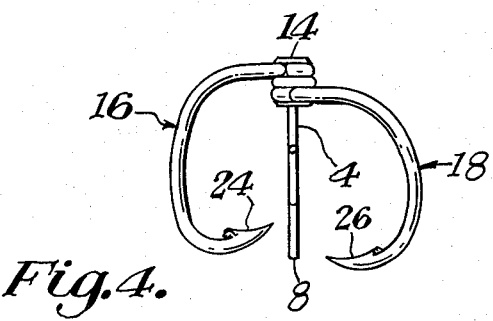
FIG. 4 is a rear view of the combination bait holder and fish hooking means as shown in FIG. 1.

Referring now to the drawings and in particular to FIGS. 1, 3 and 4, the combination bait holder and fish hooking means is shown by numeral 2, said bait holder and fish hooking means 2 including a metal wire arcuate backbone piece 4 with a mouth clamping means 5 at one end of the arcuate backbone piece. The mouth clamping portion 5 includes a distal end hill-and-dale portion 6 and the adjacent portion 7 of the arcuate backbone piece 4. The arcuate backbone piece 4 and the mouth clamping portion 5 are preferably made from a single piece of metal wire. When the hill-and-dale portion is bent over into juxtaposition with the adjacent portion 7 as shown, the bend at 8 provides an eye for connecting a fishing line to the combination bait holder and fish hooking means as shown in FIG. 2. The hill-and-dale portion shown in FIG. 1 includes at least one hill portion designated by numeral 10 and one dale portion 11. In the preferred embodiment the hill-and-dale portion includes two hill portions 10 and 12. Hill portions 10 and 12 are biased by the wire material into contact with the adjacent portion 7.

In use, the hill-and-dale portion 6 of the mouth clamping means or portion 5 is placed in the mouth of the bait fish as shown in FIG. 2. The upper lip of the bait fish may be placed against the bend 8. This forward position allows the bait fish to be moved slightly rearward when attaching the hooks 16 and 18 to the rear of the bait fish.

Referring now to FIGS. 1, 3 and 4, at least one hook is connected to the other end of the arcuate backbone piece 4. In the preferred embodiment two hooks 16 and 18 are connected to the other end of the arcuate backbone piece 4. The shank portion 20 and 22 of the hooks 16 and 18 are positioned as shown in FIGS. 1, 3 and 4. The eyes of hooks 16 and 18 are utilized to connect the hooks to the other end of the arcuate backbone piece 4. A rivet 14 is passed through the eyes of the hook and an eye formed at the other end of the arcuate backbone piece 4. Each end of the rivet is bent into a configuration larger than the eyes of the hooks or the eye at the end of the arcuate backbone. Hooks 16 and 18 are therefore pivotable about the eye of each hook as shown in FIG. 3 in the phantom illustration as numerals 16' and 18'. The barbed ends 24 and 26 of the hooks are positioned downwardly as illustrated in FIGS. 1 and 4.

In use, the hooks are spread apart in order to fit on each side of the bait fish that is first connected to the mouth clamping portion 5. After connecting the mouth clamping portion to the mouth of the bait fish, the bait fish may be moved slightly rearwardly as the hooks are moved together in order to impale the back of the bait fish on the hook as illustrated in FIG. 2. A fishing line may then be connected to the combination bait holder and fish hooking means adjacent at bend 8.

The hooks may be pointed inwardly or outwardly or held in a neutral position. FIG. 3 illustrates the hooks with the barbed ends pointed inwardly toward one another.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A fish bait holding device comprising;
an arcuate body having a generally convex upper side and a concave lower side,
a clamping means connected to the forward portion of said body, said clamping means includes a hill-and-dale portion and an adjacent portion of said body, said hill-and-dale portion biased toward the concave side of said adjacent portion of said body, said hill-and-dale portion projects rearwardly for placement in the mouth of the bait fish to hold the head of the bait fish against the concave side of said body and to prevent the fish bait from moving forward off the device,
a fishing line connecting means positioned between said body and said adjacent portion of said body,
a hook means connected to the rearward portion of said body, said hook means including two hooks moveable relative to one another for impaling the sides of the fish bait between the first and second hooks to prevent the fish bait from moving rearwardly off the device, and
said fish hooks include eyes pivotally connected to said body, said hooks have barbs positioned below the concave side of said body and moveable toward and away from one another for engagement with opposite sides of the bait fish.

2. A bait holding device comprising;
a body including at least two portions,
a clamping means connected to one of the portions of said body, said clamping means includes a bait mouth portion and an adjacent portion of said body, said bait mouth portion biased toward said adjacent portion of said body, said bait mouth portion projects rearwardly for placement in the mouth of the bait to hold the head of the bait to prevent the bait from moving forward off the device,
a fishing line connecting means connected to said body, and
a hook means connected to the said body for impaling the fish bait to prevent the bait from moving rearwardly off the device, said hook means includes at least two hooks with eyes pivotally connected to the rearward end of said body, said hooks having barbs on the distal ends thereof, whereby said barbs may be pivoted toward one another to impale the bait.

3. A bait holding device comprising;
a body including at least two portions,
a clamping means connected to one of the portions of said body, said clamping means includes a bait mouth portion and an adjacent portion of said body, said bait mouth portion biased toward said adjacent portion of said body, said bait mouth portion projects rearwardly for placement in the mouth of the bait to hold the head of the bait to prevent the bait from moving forward off the device,
a fishing line connecting means connected to said body, and
a hook means connected to the said body for impaling the fish bait to prevent the bait from moving rearwardly off the device, said hook means includes at least two hooks with eyes pivotally connected to the rearward end of said body, said hooks having barbs on the distal ends thereof, whereby said barbs may be pivoted toward one another to impale the bait, and
said clamping means is connected to the forward portion of said body, said bait mouth portion is a hill-and-dale portion.

4. A bait holding device as set forth in claim 3, wherein;
said body is arcuate in shape, and
said hill-and-dale portion is biased toward the adjacent concave side of said adjacent portion of said body.

5. A bait holding device as set forth in claim 2, wherein;
said fishing line connecting means is positioned between said body and said clamping member.

* * * * *